United States Patent [19]

Rice et al.

[11] 4,428,601
[45] Jan. 31, 1984

[54] Y-CONNECTION FOR FLEXIBLE CONDUIT

[76] Inventors: Robert Rice, P.O. Box 454, San Martin, Calif. 95046; Robert Ferreira, 2885 Hay Loft Way, Morgan Hill, Calif. 95037

[21] Appl. No.: 232,863

[22] Filed: Feb. 9, 1981

[51] Int. Cl.³ .................................................. F16L 41/00
[52] U.S. Cl. ............................. 285/197; 285/DIG. 4
[58] Field of Search ............... 285/197, 189, DIG. 4, 285/199, 198, 200, 208; 137/318

[56] References Cited

U.S. PATENT DOCUMENTS

| | | | |
|---|---|---|---|
| 562,067 | 6/1896 | Copeland | 285/189 X |
| 1,823,028 | 9/1931 | Caldwell | 285/189 |
| 1,908,821 | 5/1933 | Cornell, Jr. | 285/197 |
| 1,941,465 | 1/1934 | Cornell | |
| 2,101,311 | 12/1937 | Duncan | 285/189 X |
| 2,541,208 | 2/1951 | Cornelius | |
| 2,963,783 | 12/1960 | Field | 285/189 X |
| 3,120,965 | 2/1964 | MacDonald | |
| 3,406,988 | 10/1968 | Jones | |
| 3,645,566 | 2/1972 | Dyck | 285/197 |
| 3,649,055 | 3/1972 | Nilsen | 285/197 |
| 3,873,391 | 3/1975 | Plauka, et al. | |

FOREIGN PATENT DOCUMENTS

| | | | |
|---|---|---|---|
| 1040579 | 10/1953 | France | 285/189 |
| 578706 | 9/1946 | United Kingdom | 285/200 |
| 908311 | 10/1962 | United Kingdom | 285/189 |

Primary Examiner—Thomas F. Callaghan
Attorney, Agent, or Firm—Jack M. Wiseman

[57] ABSTRACT

A Y-connection for sheet metal conduits wherein a shoe is adapted to be placed inside a main conduit, and a saddle, to which a branch conduit is connected, is adapted to be placed against the outer surface of the main conduit. The inner shoe, and the saddle are provided with holes therethrough that are aligned with a hole in the main conduit when the shoe and saddle are secured together with a portion of the main conduit sandwiched therebetween.

4 Claims, 3 Drawing Figures

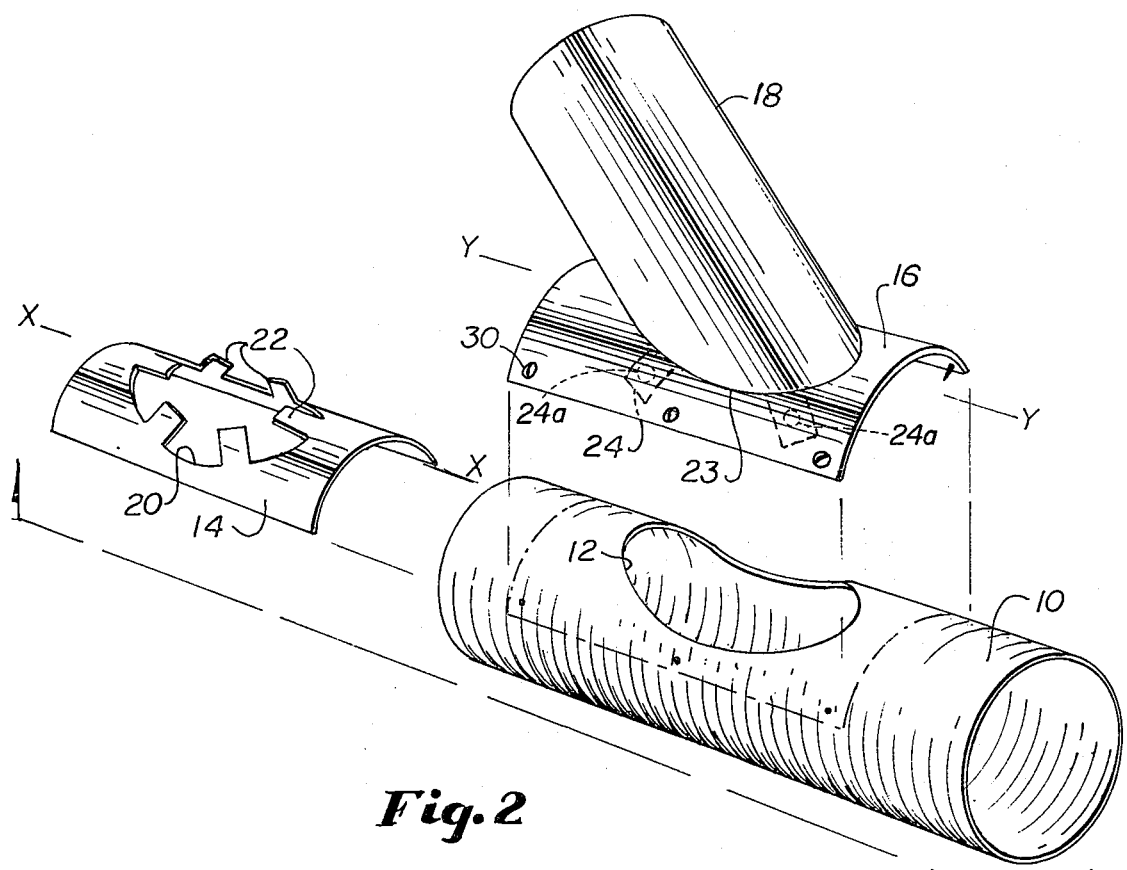
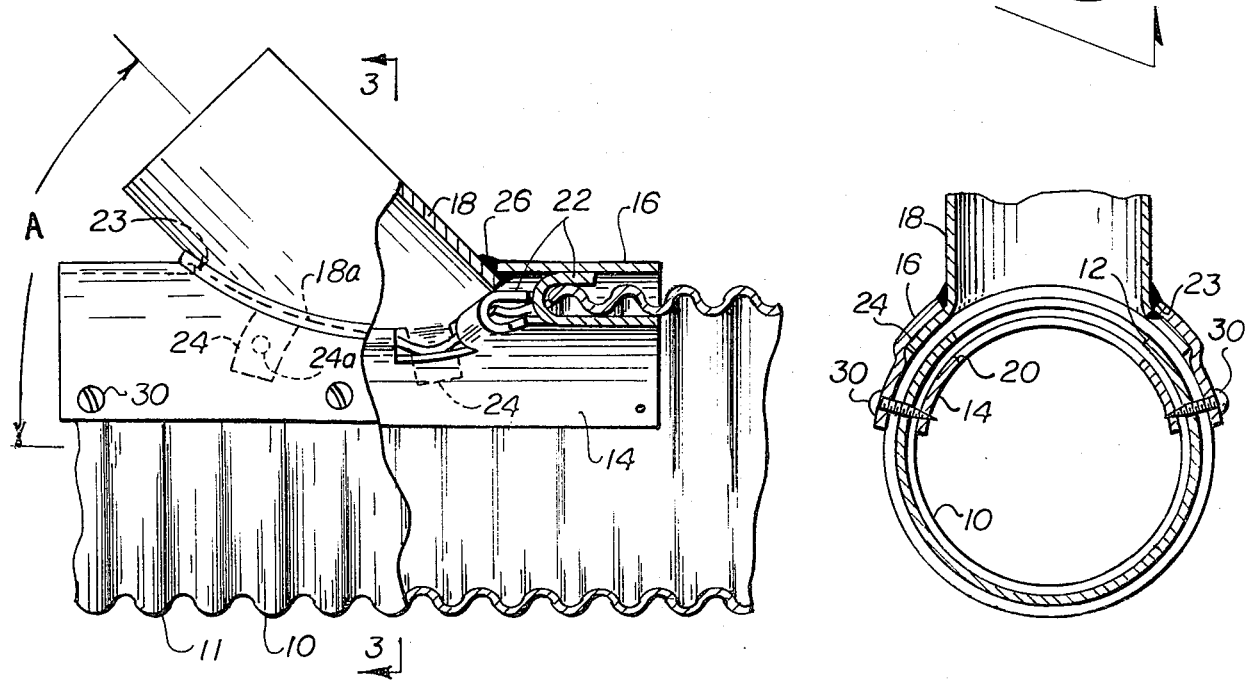
Fig. 1   Fig. 3   Fig. 2

Y-CONNECTION FOR FLEXIBLE CONDUIT

BACKGROUND OF THE INVENTION

In ductwork it is often necessary to connect a thin-wall metal tubular conduit into a main conduit at an acute angle to make what is commonly referred to as a Y-connection. Several devices have been proposed for making such a connection when the main conduit is relatively rigid such as those disclosed in patents to: Cornell U.S. Pat. No. 1,908,821; Jones U.S. Pat. No. 3,406,988; and Plauka et al., U.S. Pat. No. 3,873,391. The Cornell patent teaches the use of a rigid saddle, that is arranged to overlie the hole in the main conduit, with the branch conduit disposed over a sleeve integrally formed on the saddle; the Jones patent discloses the use of a flexible sleeve to make the connection; and the patent to Plauka et al. concerns a method of connecting the branch conduit to the main conduit without using any auxiliary connector members. Another way of making this connection involves a plurality of tabs extending from the lower end of the branch conduit that are arranged to project through the hole in the main conduit and be bent back to hold the branch conduit on the main conduit. The prior art concerning Y-connections for a flexible main conduit is very limited. To applicants knowledge, only one patent is directed to such a device and that is the patent to MacDonald U.S. Pat. No. 3,120,965 which discloses apparatus for making a Y-connection, at the point not over a hole in the main conduit, but where two flexible metal conduits are joined. Again, this disclosure concerns the use of a saddle adapted to be disposed on the outside of the two pipes.

Accordingly, it is an object of the present invention to provide an improved Y-connection for a conduit. A further object is to provide apparatus for making a Y-connection over a hole in a thin-wall flexible metal conduit.

SUMMARY OF THE PRESENT INVENTION

A Y-connection comprises an inner shoe adapted to be disposed internally of a flexible main conduit around a hole cut therein to provide a backing member around the hole, an outer saddle disposed over the hole and having an aperture in alignment with the aperture in the inner shoe and with the hole in the main conduit, a branch conduit connected to the saddle, and means for fastening the saddle and the inner shoe together with the flexible main conduit sandwiched therebetween. The inner shoe is provided with means for holding it in place while the saddle is being positioned, and the branch conduit also has means for holding it in position on the saddle while means for making a more secure joint between these members is being applied at the junction between the members.

DESCRIPTION OF THE DRAWINGS

FIG. 1 is a side elevation of the Y-connection of the present invention, partly broken away and partly in section.

FIG. 2 is a diagrammatic exploded perspective of the connection of FIG. 1.

FIG. 3 is a section taken along lines 3—3 of FIG. 1.

DESCRIPTION OF THE PREFERRED EMBODIMENT

In FIG. 1 the reference numeral 10 indicates a thin-wall metal main conduit which has a plurality of grooves or corrugations 11 extending around its periphery to provide the conduit with a degree of flexibility. A hole 12 (FIG. 2) is cut through the wall of the main conduit. The connection of the present invention includes an inner shoe 14, a saddle 16 and a short section of a branch conduit 18. The inner shoe 14 is a thin sheet metal member which is provided with a hole 20 that has substantially the same configuration as the hole in the conduit. The hole 20 is so cut in the shoe that a plurality of tabs 22 are left to project into the opening. To lock the inner shoe to the main conduit, the shoe is placed against the inner wall of the conduit with the hole 20 in the shoe in alignment with the hole 12 in the conduit, and then the tabs 22 are bent to extend through the hole 12 and then are pressed back against the outer face of the conduit as seen in FIG. 1.

The saddle 16 (FIG. 2) is a thin sheet metal member having a hole 23 therethrough, which corresponds substantially to the holes 12 and 20 in configuration. Both the shoe 14 and the saddle 16 are dimensioned to extend around about 160° of the periphery of the conduit 10.

The section of the branch conduit 18 is cut off at an angle such that, when it is connected to main conduit 10, the desired angle "A" (FIG. 1) between the conduits 10 and 18 is obtained. The branch conduit 18 is attached to the saddle 16 before the saddle is connected to conduit 10, at a time when the saddle has been bent to a curvature corresponding to the curvature of the outer surface of conduit 10. According, the angled cut at the end of the conduit 18 must be curved along its sides, as indicated at 18a (FIG. 2) so that the edge of the conduit will lie close to the curved edge around the hole 23 in the saddle.

The branch conduit 18 is secured on the saddle 16 by tabs 24 (FIG. 3) that extend outwardly from the lower curved edge of the conduit 18. To make this connection the saddle 16 is held in its final curved position, and the conduit 18 is moved endwise toward the hole 24 in the saddle so that its end extends into the opening 23. The tabs 24 are inserted into the hole and then bent outwardly to lie flat against the inner surface of the saddle around the hole 23. Rivets 24a or spot welds or other suitable means firmly secure the tabs to the saddle.

After the branch conduit 18 is locked on the saddle 16, a suitable sealant 26, such as a silicon sealant in heavy paste-like form, is spread over the joint between the outside surface of the saddle around the opening 23 and the lower outer surface of the conduit 18. Also, sealant is spread over the joint between the inner surface of the saddle 16 around the hole 23 and the lower end of the conduit 18.

It will be understood that the configuration of the openings in the conduit 10, in the shoe 14 and in the saddle 16 will vary from round to oval depending upon the desired angle of intersection between the two conduits.

After the inner shoe 14 has been locked to the inner surface of conduit 10 and the branch conduit 18 is sealed to the saddle 16, the saddle 16 is positioned over the hole 12 in conduit 10, as indicated in FIG. 2, and secured thereto by sheet metal screws 30.

It will be noted that in the completely assembled condition, the tabs 22 of the inner shoe 14 and the tabs 24 of the saddle 16 are disposed between the inner surface of the saddle 16 and the outer surface of the conduit 10. Thus the tabs 22 of the inner shoe 14 do not interpenetrate into the saddle 16 and the tabs 24 of the saddle 16 do not interpenetrate into the inner shoe 14. These may partially overlie each other or they may be located so that they interdigitate and do not overlie each other. For example, the six tabs 22 of the inner shoe may be positioned on the longitudinal centerline X—X of the hole 20 and at 45 degrees relative to the centerline; and the positions of the tabs 24 of the branch conduit relative to the longitudinal centerline Y—Y of the hole in the saddle 16 can then be selected so that the two sets of tabs do not interfere with each other.

We claim:

1. An apparatus for connecting a branch conduit in flow communication with a main conduit that has an aperture therein, backing means positionable against the inner surface of said main conduit in the marginal area around the aperture therein, an apertured saddle positionable against the outer surface of the main conduit with the aperture in the saddle registering with the aperture in the main conduit, the main conduit being disposed between said backing means and said saddle without any portion of said backing means interpenetrating into said saddle, means for securing the branch conduit to said saddle, and means for securing said saddle and said backing means to said main conduit with the main conduit disposed between said backing means and said saddle and with the branch conduit in flow communication with the interior of the main conduit through the aperture in the main conduit, said means for securing the branch conduit to said saddle including a plurality of tabs formed to extend longitudinally of the conduit on the end of the branch conduit that is to be connected to said saddle, each tab being adapted to be inserted through the aperture in said saddle and bent back against the inner concave surface of the saddle, said securing means for securing said branch conduit to said saddle further including fastening means for securing each tab to said saddle.

2. Apparatus according to claim 1 wherein said fastening means comprises rivets extending through said tabs and said saddle.

3. The apparatus of claim 1 further including a sealant for closing the opening around the juncture of the branch conduit and said saddle.

4. Apparatus for securing a branch conduit in flow communication with a main conduit comprising means defining an opening in the main conduit, a curved apertured shoe positioned against the inner surface of the main conduit with the aperture in said shoe in registry with the opening in the main conduit, a plurality of tabs formed on said shoe around the aperture, each tab being disposed in the opening of the main conduit and having a portion bent back against the outer surface of the main conduit to hold the shoe on the main conduit, an apertured saddle disposed over the tab portions of said shoe on the exterior of the main conduit, the main conduit being disposed between said shoe and said saddle without any portion of said shoe interpenetrating into said saddle, means for securing a short section of the branch conduit to said saddle including a plurality of tabs formed on the section and projecting through the aperture in said saddle, means for securing a portion of the tabs of the branch conduit to the inner concave surface of said saddle, and means for securing said shoe and said saddle to the main conduit with the tabs of said shoe and the tabs of the branch conduit disposed between the saddle and the outer surface of the main conduit.

* * * * *